(12) United States Patent
Ghoneim et al.

(10) Patent No.: US 6,879,898 B2
(45) Date of Patent: Apr. 12, 2005

(54) METHOD AND APPARATUS FOR VEHICLE INTEGRATED CHASSIS CONTROL SYSTEM

(75) Inventors: Youssef Ahmed Ghoneim, Macomb Township, Macomb County, MI (US); Christian Bielaczek, Bad Vilbel (DE)

(73) Assignee: General Motors Corporation, Detroit, MI (US)

( * ) Notice: Subject to any disclaimer, the term of this patent is extended or adjusted under 35 U.S.C. 154(b) by 63 days.

(21) Appl. No.: 10/336,226

(22) Filed: Jan. 3, 2003

(65) Prior Publication Data

US 2004/0133326 A1 Jul. 8, 2004

(51) Int. Cl.[7] .......................... B60G 21/66; G06F 17/00
(52) U.S. Cl. .............................. 701/48; 701/37; 701/52; 180/65.6; 280/5.507
(58) Field of Search ............................. 701/48, 52, 36, 701/37, 38, 41; 180/65.6, 89.14; 280/5.507

(56) References Cited

U.S. PATENT DOCUMENTS

| | | | | |
|---|---|---|---|---|
| 4,621,833 A | | 11/1986 | Soltis | 280/707 |
| 4,691,284 A | * | 9/1987 | Izumi et al. | 701/38 |
| 4,949,261 A | * | 8/1990 | Ito et al. | 701/41 |
| 5,037,119 A | * | 8/1991 | Takehara et al. | 180/415 |
| 5,183,127 A | * | 2/1993 | Kageyama et al. | 180/197 |
| 5,481,458 A | * | 1/1996 | Harara et al. | 701/37 |
| 5,508,921 A | | 4/1996 | Chikuma et al. | 364/424.05 |
| 5,524,079 A | | 6/1996 | Ishida et al. | 364/424.05 |
| 5,632,503 A | | 5/1997 | Raad et al. | 280/707 |
| 5,636,121 A | * | 6/1997 | Tsuyama et al. | 701/70 |
| 5,720,533 A | | 2/1998 | Pastor et al. | 303/147 |
| 5,746,486 A | | 5/1998 | Paul et al. | 303/146 |
| 5,906,560 A | * | 5/1999 | Minowa et al. | 477/97 |
| 5,906,645 A | * | 5/1999 | Kagawa et al. | 701/23 |
| 6,041,886 A | | 3/2000 | Nakaishi et al. | 180/444 |
| 6,074,020 A | * | 6/2000 | Takahashi et al. | 303/146 |
| 6,112,147 A | | 8/2000 | Ghoneim et al. | 701/80 |
| 6,125,319 A | | 9/2000 | Hac et al. | 701/80 |
| 6,161,905 A | | 12/2000 | Hac et al. | 303/146 |
| 6,169,951 B1 | | 1/2001 | Ghoneim et al. | 701/70 |
| 6,175,790 B1 | | 1/2001 | Lin et al. | 701/36 |
| 6,188,945 B1 | * | 2/2001 | Graf et al. | 701/58 |
| 6,195,606 B1 | | 2/2001 | Barta et al. | 701/70 |
| 6,199,003 B1 | * | 3/2001 | Hollingsworth et al. | 701/52 |
| 6,205,391 B1 | | 3/2001 | Ghoneim et al. | 701/70 |
| 6,434,472 B1 | * | 8/2002 | Minowa et al. | 701/96 |

FOREIGN PATENT DOCUMENTS

| | | |
|---|---|---|
| DE | 198 05 004 | 11/1998 |
| EP | 1 028 011 | 8/2000 |
| EP | 1 355 209 | 10/2003 |
| FR | 2 714 642 | 7/1995 |

OTHER PUBLICATIONS

A copy of the European Search Report (Apr. 5, 2004).
Furukawa, Yoshimi et al., "A Review of Four–Wheel Steering Studies from the Viewpoint of Vehicle Dynamics and Control", 1989, pp. 151–186, month is not available.
Whitehead, John C., "Response and Stability of Rear Wheel Steering Vehicles", Nov. 1988, p. 1–7.

\* cited by examiner

Primary Examiner—Tan Q. Nguyen
(74) Attorney, Agent, or Firm—Kathryn A. Marra

(57) ABSTRACT

An integrated chassis control system for a vehicle having at least one vehicle subsystem is provided, which includes; at least one sensor for sensing at least one vehicle parameter, at least one vehicle control system for adjusting the at least one vehicle subsystem, a driving mode switch for selecting at least one driving mode, and a controller responsive to the at least one sensor and the driving mode switch. The controller is adapted for controlling the at least one vehicle control system in accordance with the at least one driving mode.

19 Claims, 4 Drawing Sheets

METHOD AND APPARATUS FOR VEHICLE INTEGRATED CHASSIS CONTROL SYSTEM

TECHNICAL FIELD

This invention relates generally to an integrated chassis control system for a vehicle and a method of operation thereof, and more particularly to an integral set of chassis subsystems that respond to a central controller.

BACKGROUND

Traditional vehicle chassis subsystems, such as steering, braking and suspension subsystems, are passive, meaning that their responsiveness under operating conditions is determined prior to the vehicle leaving the point of manufacture. In such traditional arrangements, the design of the particular chassis subsystem must be determined up-front and must take into consideration the purpose of the vehicle, such as, for example, whether the vehicle will be used primarily as a cruising vehicle or whether it will be used primarily as a sporty, high performance, vehicle. By design, such traditional chassis subsystems cannot adapt or actively respond in real time to a change in driving mode as requested by the driver.

SUMMARY

In one embodiment, an integrated chassis control system for a vehicle having at least one vehicle subsystem is provided, which comprises; at least one sensor for sensing at least one vehicle parameter, at least one vehicle control system for adjusting the at least one vehicle subsystem, a driving mode switch for selecting at least one driving mode, and a controller responsive to the at least one sensor and the driving mode switch. The controller is adapted for controlling the at least one vehicle control system in accordance with the at least one driving mode.

In another embodiment, a method for actively controlling an integrated chassis system for a vehicle is provided, which comprises; sensing at least one vehicle parameter, receiving at least one vehicle parameter signal representative of the at least one vehicle parameter, receiving a driving mode signal representative of a driving mode request, determining a stability flag setting in response to the at least one vehicle parameter signal and at least one programmed parameter, analyzing the driving mode signal in view of the at least one vehicle parameter signal and the stability flag setting, determining at least one control command, communicating the at least one control command to at least one vehicle control system, and actuating the at least one vehicle control system for adjusting the at least one vehicle subsystem in response to the at least one vehicle parameter signal, the driving mode signal, and the stability flag setting.

BRIEF DESCRIPTION OF THE DRAWINGS

Referring now to the figures, which are exemplary embodiments, and wherein like elements are numbered alike.

DETAILED DESCRIPTION

A detailed description of an embodiment of the present invention is presented herein by way of exemplification and not limitation with reference to FIGS. 1–5.

Vehicle

Figure 1:
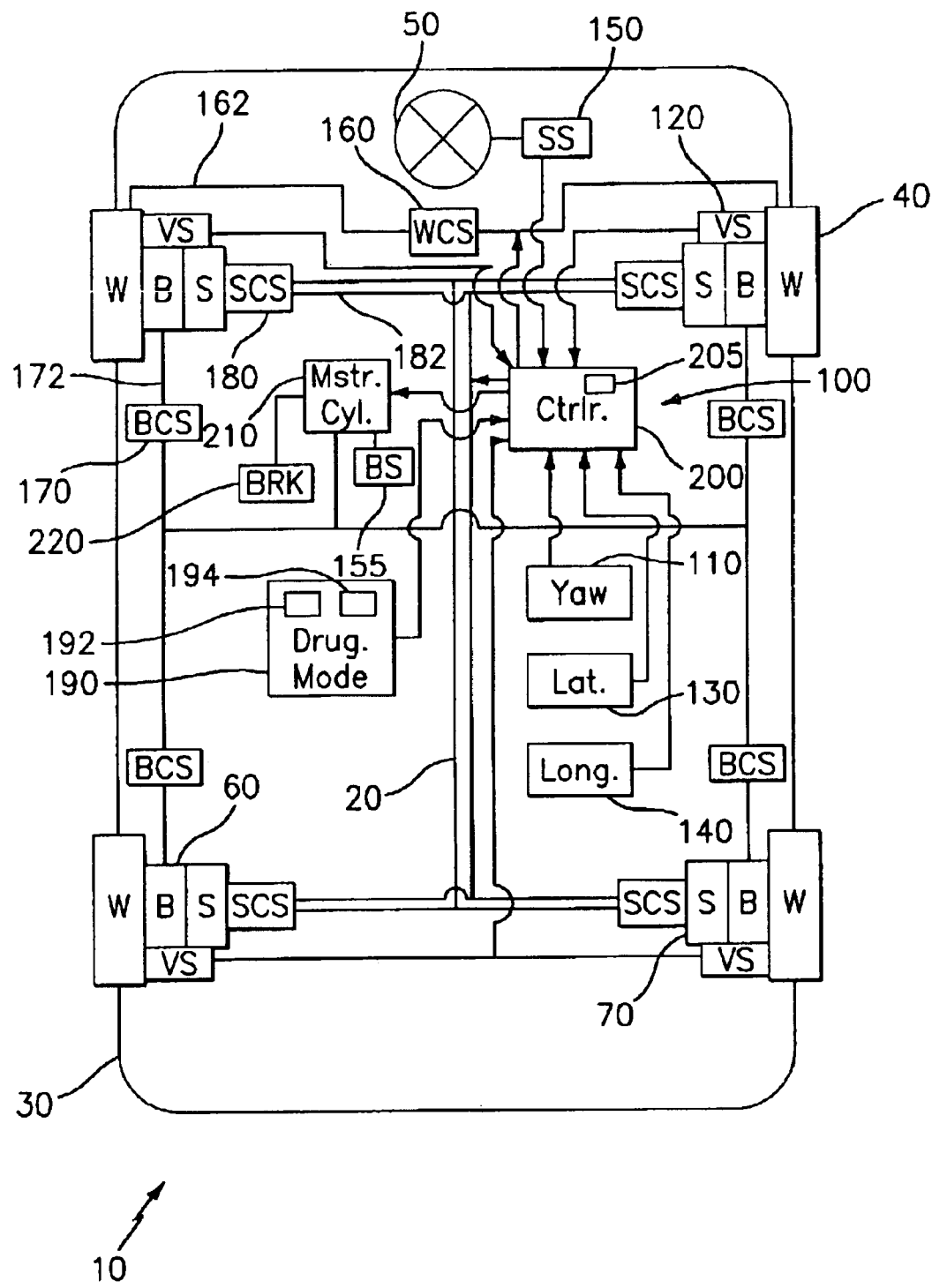
FIG. 1 depicts a generalized schematic of a vehicle operative for implementing the present invention.

FIG. 1 depicts a generalized schematic of a vehicle 10 having a chassis 20, a body 30 arranged on chassis 20, a set of wheels ("W") 40 rotationally coupled to chassis 20, a steering mechanism 50 arranged for steering wheels 40, a braking mechanism ("B") 60 arranged for decelerating wheels 40 upon command, a suspension mechanism ("S") 70 disposed between wheels 40 and chassis 20 for damping vibration at wheels 40, and an integrated chassis control system (ICCS) 100. The ICCS 100 includes: a yaw rate sensor ("Yaw") 110 for sensing the actual vehicle yaw rate in degrees-per-second; wheel velocity sensors ("VS") 120, which is indicative of the vehicle velocity; a lateral acceleration sensor ("Lat") 130, such as for example an accelerometer, for sensing the absolute value of the vehicle's lateral acceleration in g-force; a longitudinal acceleration sensor 140 ("Long") (e.g., accelerometer) for sensing the absolute value of the vehicle's longitudinal acceleration in g-force; and a steering angle sensor ("SS") 150 for sensing the angle of steer for the steering wheels. The sensed parameters are herein referred to as vehicle parameters. The ICCS 100 also includes the following vehicle control systems: a steering mechanism control system ("WCS") 160, such as, for example, electronically controlled actuators and dampers, for adjusting the stiffness and damping characteristics of, and the degree of steering assist associated with, the steering mechanism 50; a braking mechanism control system ("BCS") 170 (e.g., electronically controlled actuators and dampers) for adjusting the stiffness and damping characteristics of, and the degree of pressure-apply rate associated with, the braking mechanism 60; and a suspension mechanism control system ("SCS") 180 (e.g., electronically controlled actuators and dampers) for adjusting the stiffness and damping characteristics of the suspension mechanism 70. The ICCS 100 further includes; a driving mode switch ("Drvg Mode") 190 for enabling a driver to selectively chose between multiple driving modes, such as, for example, "Normal" and "Sporty" modes, where the "Normal" mode may be for highway cruising and the "Sporty" mode may be for high performance handling; and a central controller 200 arranged in operable communication with sensors 110, 120, 130, 140, 150, and mechanism control systems 160, 170, 180. Control lines 162, 172, 182, are depicted, for simplicity, as single lines, but represent both signal communication lines and operational links for communicating with and actuating the mechanism control systems 160, 170, 180. Driving mode switch 190 may include a pushbutton type switch 192, or any other type of switch suitable for producing a driving mode request signal, and a display 194 for providing feedback to the driver regarding the driving mode setting. BCS 170 is in operable communication with controller 200 via brake master cylinder ("Mstr Cyl") 210. "Mstr Cyl" 210 is also in operable communication with brake pedal ("Brk") 220. Braking mechanism 60 may be operated by the driver via brake pedal 220 and master cylinder 210, or by controller 200 via the ICCS 100, master cylinder 210, and brake mechanism control system 170. It will be appreciated that while BCS 170 is depicted in the schematic of FIG. 1 as being located between master cylinder 210 and each braking mechanism 60, it may also be located between controller 200 and master cylinder 210, depending on whether individual or concurrent wheel braking is desired.

It will also be appreciated that while the disclosed embodiment refers to only two driving modes, the invention described herein is applicable to any number of driving modes. It will further be appreciated that while the disclosed embodiment refers to a vehicle, such as an automobile, having four wheels, the invention described herein is applicable to any vehicle with any number of wheels. Such alternative vehicles to the disclosed embodiment may be, for example and without limitation, a three-wheel or six-wheel off-road vehicle, designed with normal, sporty, and hill climbing driving modes.

Controller

Figure 2:
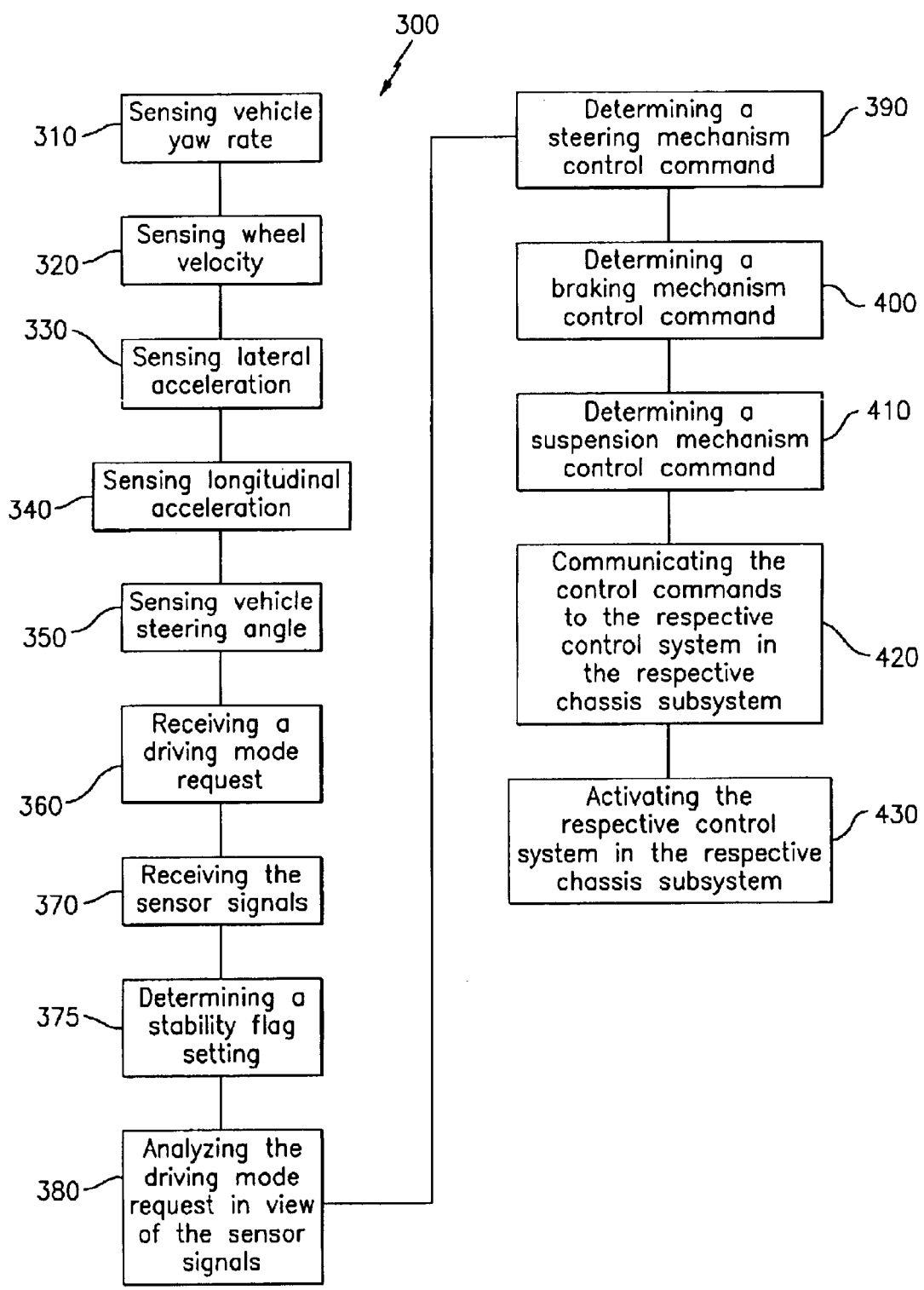
FIG. 2 depicts a method for implementing the present invention.

Controller 200 is a microprocessor based control system adapted for actively controlling the integrated set of chassis subsystems, that is, steering mechanism 50, braking mechanism 60 and suspension mechanism 70. Controller 200 typically includes a microprocessor, a memory 205, such as ROM and RAM, and appropriate input and output circuits of a known type for receiving the various input signals and for outputting the various control commands to the various actuators and control systems. Referring now to FIG. 2, controller 200 performs the process 300 of; sensing 310 the vehicle's actual yaw rate at yaw rate sensor 110, sensing 320 the velocity of the wheels at wheel velocity sensors 120, sensing 330 the vehicle's lateral acceleration at lateral acceleration sensor 130, sensing 340 the vehicle's longitudinal acceleration at longitudinal acceleration sensor 140, sensing 350 the vehicle's steering angle at steering angle sensor 150, receiving 360 a driving mode request by receiving a signal from driving mode switch 190, receiving 370 the sensor signals from sensors 110, 120, 130, 140, 150, determining 375 a stability flag setting, analyzing 380 the driving mode request in view of the sensor signals, calculating 390 a steering mechanism control signal (command), calculating 400 a braking mechanism control signal (command), calculating 410 a suspension mechanism control signal (command), communicating 420 the control signals (commands) to the respective mechanism control system (for example, the steering, braking and suspension mechanism control systems) for operably adjusting and controlling the respective chassis subsystem (for example, the steering, braking and suspension mechanisms), and actuating 430 the respective mechanism control systems to adjust and control the respective chassis subsystem in response to the driver mode request and the sensor signals. Controller 200 receives sensor inputs at a sample interval of "Tsamp", as will be discussed in more detail below.

Control Logic for Analyzing Driving Mode Request

Figure 3:
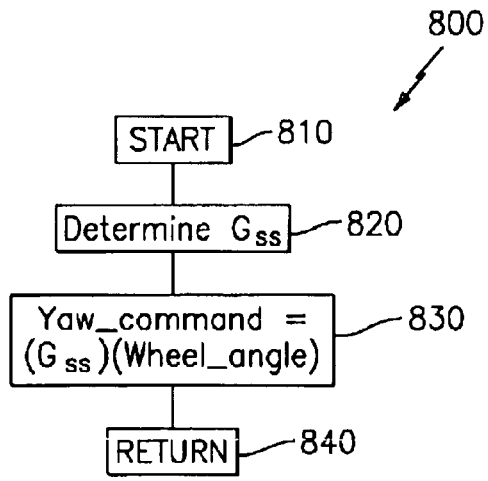
FIG. 3 depicts a flowchart for determining a driver yaw command.

The nomenclature used herein for analyzing the driving mode request in view of the sensor signals is as follows:

"Mode"=Register containing vehicle actual mode (e.g., "Normal" or "Sporty");

"Mode_req"=Register containing driver mode request, not actual mode;

"|Lat_Accel|"=Register containing absolute value of vehicle lateral acceleration (g-force);

"|Long_Accel|"=Register containing absolute value of vehicle longitudinal acceleration (g-force);

"Yaw_r"=Register containing vehicle actual yaw rate (degrees-per-second, deg/sec));

"Yaw_command"=Register containing yaw rate command based on driver input (deg/sec) (see FIG. 3);

"Yaw_err"=Register containing vehicle yaw rate error (deg/sec);

"Yaw_thr"=Register containing yaw rate threshold (deg/sec), for example, 8-deg/sec;

"Lat_th"=Register containing lateral acceleration threshold (g-force), for example, 0.6-g;

"Long_th"=Register containing longitudinal acceleration threshold (g-force), for example, 0.2-g;

"Tsamp"=Register containing control sample interval, for example, 10-milliseconds (msec);

"Timer(t)"=Register containing accumulated time from the time the change in driving mode was requested;

"Tconfirm"=Register containing additional threshold time for confirming the presence of a stable condition for a "Normal" driving mode request, for example, 0.5-sec;

"Timer_1(t)"=Register containing accumulated time that "|Yaw_err|" has been above "Yaw_thr";

"Timer_2(t)"=Register containing accumulated time that "|Yaw_err|" has been below "Yaw thr".

"Time_1"=Register containing first threshold time for "Timer_1(t)" and stability flag, for example, 100-msec;

"Time_2"=Register containing second threshold time for "Timer_2(t)" and stability flag, for example, 250-msec;

"Flag(t)"=Register containing stability flag as a function of time (set to OFF if stable and set to ON if unstable); where "||" designates an "absolute value" operator.

Referring to FIG. 3, a subroutine 800 for a determining a steady state "Yaw_command" is provided, which is one method for determining a "Yaw_command" and is provided for exemplary purposes only. After starting 810 subroutine 800, a steady state yaw gain, Gss, is determined 820 by the output, or programmed parameters, of a look-up table whose inputs are vehicle speed, Vs, from wheel velocity sensors 120, and steering wheel angle, δ, from steering angle sensor 150. Preferably, the flexibility of a look-up table adds an advantageous characteristic of the steady state yaw gain by maintaining the gain substantially linear with respect to steering wheel angle when the vehicle is in both linear and nonlinear driving modes. This can be better understood with reference to the following two tables.

TABLE 1

| $V_s$(KPH)\ (°) | 0 | 29.7 | 76.5 | 131 | 221 | 352 | 520 |
|---|---|---|---|---|---|---|---|
| 0 | 0 | 0 | 0 | 0 | 0 | 0 | 0 |
| 16 | 9.6 | 9.6 | 9.4 | 9.4 | 9.8 | 11.2 | 16.8 |
| 26 | 14.4 | 14.4 | 14.2 | 14.4 | 15.2 | 15.6 | 15.8 |
| 38 | 18.6 | 18.6 | 18.8 | 18.6 | 17 | 14.4 | 12.2 |
| 52 | 21.2 | 21.6 | 21.4 | 19 | 15 | 11.6 | 9.4 |
| 68 | 22.2 | 23 | 21.6 | 16.8 | 12.2 | 9.4 | 7.2 |
| 86 | 21.6 | 23 | 19 | 14 | 10.2 | 7.6 | 5.8 |
| 106 | 20.6 | 22 | 16.2 | 11.8 | 8.4 | 6.2 | 4.8 |
| 132 | 18.4 | 19.4 | 13.8 | 9.8 | 6.8 | 5 | 3.8 |
| 162 | 16.2 | 17 | 11.4 | 8 | 6.5 | 4 | 3.2 |
| 198 | 14.2 | 14.4 | 9.6 | 6.6 | 4.6 | 3.4 | 2.6 |
| 242 | 12 | 12.2 | 7.8 | 5.4 | 3.8 | 2.8 | 2.2 |

TABLE 2

| $V_s$(KPH)\ (°) | 0 | 29.7 | 76.5 | 131 | 221 | 352 | 520 |
|---|---|---|---|---|---|---|---|
| 0 | 0 | 0 | 0 | 0 | 0 | 0 | 0 |
| 16 | 9.6 | 9.6 | 9.4 | 9.4 | 9.8 | 11.2 | 16.8 |
| 26 | 14.4 | 14.4 | 14.2 | 14.4 | 15.2 | 15.6 | 15.8 |
| 38 | 18.6 | 18.6 | 18.8 | 18.6 | 17 | 17 | 17 |
| 52 | 21.2 | 21.6 | 21.4 | 19 | 19 | 19 | 19 |
| 68 | 22.2 | 23 | 21.6 | 21 | 21 | 21 | 21 |
| 86 | 21.6 | 23 | 23 | 23 | 23 | 23 | 23 |
| 106 | 20.6 | 22 | 22 | 22 | 22 | 22 | 22 |
| 132 | 18.4 | 19.4 | 19 | 19 | 13 | 19 | 19 |
| 162 | 16.2 | 17 | 17 | 17 | 17 | 17 | 17 |

TABLE 2-continued

| $V_s$(KPH)\ (°) | 0 | 29.7 | 76.5 | 131 | 221 | 352 | 520 |
|---|---|---|---|---|---|---|---|
| 198 | 14.2 | 14 | 14 | 14 | 14 | 14 | 14 |
| 242 | 12 | 12 | 12 | 12 | 12 | 12 | 12 |

Table 1 illustrates an example yaw gain of a typical vehicle in response to vehicle speed and steering wheel angle. As can be seen, for low steering wheel angles and at low vehicle speeds, the gain is substantially constant. As steering wheel angle increases past a certain point, or as vehicle speed increases past a certain point, the yaw gain becomes nonlinear, decreasing as steering wheel angle increase and/or vehicle speed increase. The look-up table function used according to this invention is shown with respect to Table 2, which illustrates that even when the vehicle is in the nonlinear operating region, the yaw gain is maintained constant with respect to steering wheel angle. Since the yaw gain affects the desired Yaw_command, to which the vehicle is controlled, the system thereby provides a linear response to operator steering wheel inputs even when the vehicle is in a nonlinear operating condition, i.e., even when one or more sets of tires is experiencing reduced lateral traction. From block 820, the routine continues to block 830 where the desired Yaw_command is set equal to Gss multiplied by 67, alternatively "wheel-angle". After block 830, the subroutine 800 is completed and returned 840 to the main program in controller 200.

The stability flag "Flag(t)" is a logic flag that signifies a stable system (Flag(t)=OFF) or an unstable system (Flag(t)= ON) and is determined as follows:

| |Yaw_err|=|Yaw_command-Yaw_r| | Equa.-1 |
|---|---|
| If |Yaw_err|>Yaw-thr for Time_1 | Equa.-2 |
| Then, Flag(*t*)=ON | Equa.-3 |
| Else, If |Yaw_err|<Yaw_thr for Time_2 | Equa.-4 |
| Then, Flag(*t*)=OFF | Equa.-5 |
| Else, Flag(*t*)=Flag(*t*-Tsamp) | Equa.-6 |
| EndIf | Equa.-7 |
| EndIf | Equa.-8 |

Figure 4:
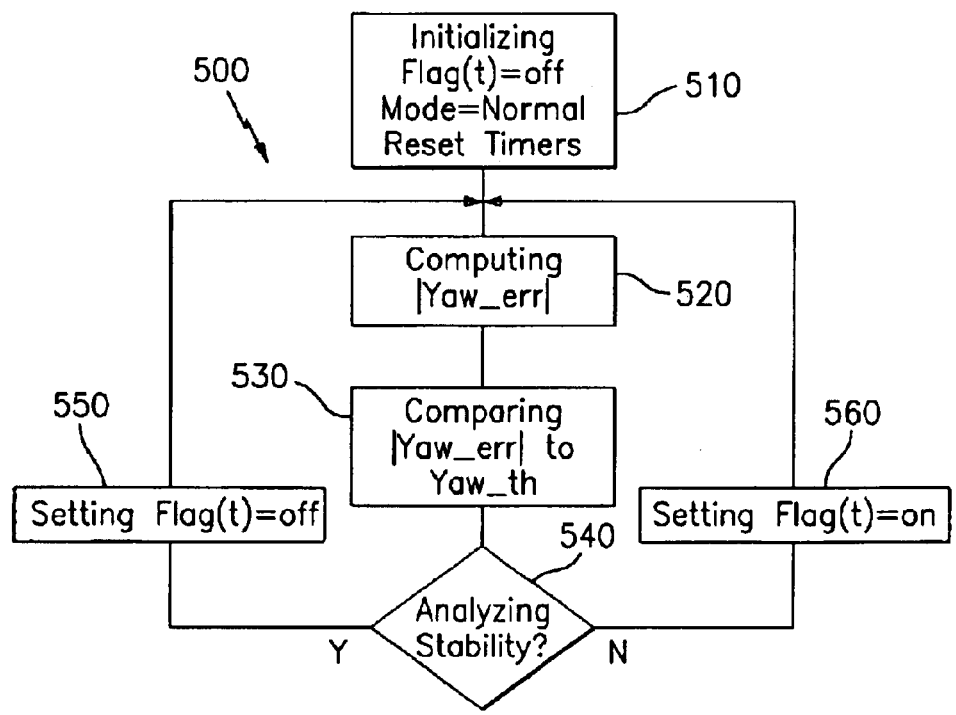
FIG. 4 depicts a flowchart for analyzing a vehicle stability.

FIG. 4 depicts a flowchart for the process 500 of computing the stability flag "Flag(t)". Upon initializing 510 the ICCS 100, "Flag(t)" is set to OFF, "Mode" is set to "Normal", the timers "Timer(t)", "Timer_1(t)" and "Timer_2(t)" are set to zero. After initialization, such as when the vehicle's electrical system is first activated or powered up, process 500 continues by computing 520 the absolute value of the yaw rate error "|Yaw_err|" in accordance with Equa.-1, comparing 530 the "|Yaw_err|" to the yaw rate threshold "Yaw_thr" in accordance with Equas.-2 and 4, analyzing 540 the stability of the system by analyzing the time of existence of "|Yaw_err|" with respect to threshold times (e.g., "Time_1", "Time_2") in accordance with Equas.-2 and 4, setting 550 "Flag(t)" to OFF if the system is stable in accordance with Equas.-5 and 6, and setting 560 "Flag(t)" to ON if the system is not stable in accordance with Equas.-3 and 6. The logic sequence is ended in accordance with Equas.-7 and 8. As noted above, Equas.-2 and 4 establish whether the system is stable, thereby allowing a change in driving mode to occur. The existence of an unstable system, where "Flag(t)" is set to ON, signifies that a change in driving mode may be undesirable.

Figure 5:
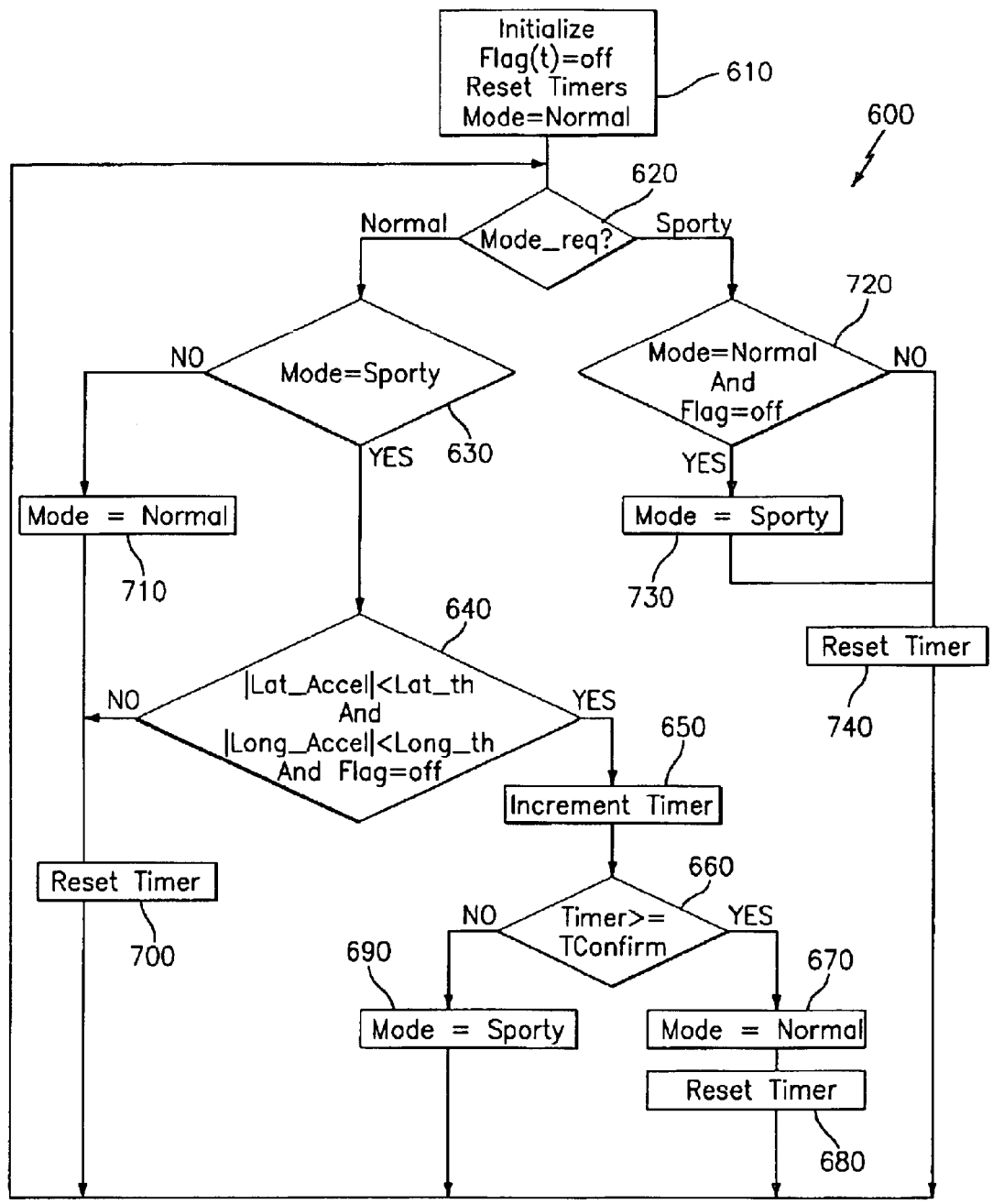
FIG. 5 depicts a flowchart for implementing the method of FIG. 2.

After the stability flag, "Flag(t)", has been determined in accordance with Equations 1–8, block 375 in FIG. 2 and process 500 in FIG. 4, the control logic in controller 200 then follows process 600, best seen by referring to FIG. 5, which depicts the details of process block 380 from FIG. 2. In accordance with FIG. 5, which begins with the step of initializing 610 the ICCS 100, process 600 continues by analyzing 620 the driving mode request "Mode-req" for a setting of "Normal" or "Sporty". If "Mode_req" is set at "Normal", process 600 continues by analyzing 630 the state of the actual vehicle driving mode, "Mode". If "Mode" is set to "Sporty", then a change in driving mode has been requested, which prompts a stability analysis at block 640. If the ICCS 100 determines that a change in driving mode under present conditions would result in an unstable driving condition, then the requested driving mode change will not be acknowledged. However, if the ICCS 100 determines that stable conditions exist, then the requested driving mode change may be implemented in accordance with FIG. 4. At this stage of process 600, the stability analysis involves analyzing 640; the absolute value of vehicle lateral acceleration "|Lat_Accel|" against the lateral acceleration threshold "Lat_th", the absolute value of vehicle longitudinal acceleration "|Long_Accel|" against the longitudinal acceleration threshold "Long_th", and the state of stability flag "Flag(t)". If the conditions of block 640 in FIG. 4 are met, the process continues to block 650, which increments the "Timer(t)" by the predefined time increment "Tsamp".

The process continues by analyzing 660 the value of "Timer(t)" against the pre-established value of "Tconfirm". If the conditions of block 660 are met, which signifies that the driver mode request has been confirmed and the driver mode request signal was above a noise threshold level, then the process continues by setting 670 "Mode" to "Normal", resetting 680 "Timer(t)", and passing the control logic back to block 620. If at block 660, the conditions of block 660 are not met, which signifies that the driver mode request has not been confirmed, then the process continues by setting 690 "Mode" to "Sporty", and passing the control logic back to block 620.

If at block 640, the conditions of block 640 are not met, the process continues by resetting 700 "Timer(t)", and passing the control logic back to block 620. If at block 630, "Mode" is set to "Normal", then no driving mode change has been requested and the process continues by setting 710 "Mode" to "Normal", and passing the control logic to block 700.

If at block 620, the conditions of block 620 are such that "Mode-req" is set to "Sporty", then the process continues by analyzing 720 "Mode" for a setting of "Normal", and analyzing 720 "Flag(t)" for a setting of "OFF". If the conditions of block 720 are met, indicating that a driving mode change has been requested and the system is stable, the process continues by setting 730 "Mode" to "Sporty", resetting 740 "Timer(t)", and passing the control logic to block 620. If the conditions of block 720 are not met, then the requested change in driving mode is not acknowledged, and the process continues to block 740.

Stability Flag Generally

Upon energizing the ICCS 100 in vehicle 10, the controller logic initializes the ICCS 100 according to blocks 510 and 610, whereby the driving mode "Mode" is set to "Normal", the timers "Timer(t)", "Timer_1(t)" and "Timer_2(t)" are reset to zero, and the stability flag "Flag (t)" is set to OFF. The microprocessor in controller 200 samples the sensors, as discussed above, at a control sample interval of "Tsamp", and retains the last sensor inputs in memory. Controller 200 also calculates the value of stability flag "Flag(t)" at sample interval "Tsamp" according to process 500 and Equas.1–8 as discussed above. If "|Yaw_err|", (the absolute value of the vehicle yaw rate error), exceeds "Yaw_thr", (the yaw rate threshold), then "Timer_1(t)" is started and the value compared against "Time_1". If "|Yaw_err|" falls below "Yaw_thr", then "Timer_2(t)" is started and the value compared against "Time_2". If a mode change request is received, then "Timer(t)" is started and the value compared against "Tconfirm". If the system goes unstable, meaning that a change in driving mode would be undesirable, then "Flag(t)" is set to ON (a "Flag(t)" setting of ON merely signifies that a change in driving mode may be undesirable), as discussed above. If the system is stable, meaning that a change in driving mode may be implemented, then "Flag(t)" is set to OFF, as discussed above. "Timer(t)" is reset to zero in accordance with blocks 680, 700, 740 in FIG. 5.

As discussed above, the driver-requested driving modes are not limited to "Normal" and "Sporty" and are discussed in this manner for exemplary purposes only. By changing the driving mode between "Normal" and "Sporty", the driver can experience more than one "feel" to the handling of the vehicle. The aforementioned mechanism control systems 160, 170, 180 include electronically controlled actuators and dampers that control the responsiveness of the steering, braking and suspension mechanisms 50, 60, 70, respectively. For example, in "Normal" mode, the braking mechanism may have early intervention with a smaller deadband and a high pressure-apply rate, the steering mechanism may have high steering assist, and the suspension mechanism may have a smooth ride. Alternatively, in the "Sporty" mode, the braking mechanism may have later intervention with a larger deadband and an initial slow pressure-apply rate, the steering mechanism may have low steering assist, and the suspension mechanism may have a stiff ride. In providing a driving mode selection switch with stability determination and intelligent switching, the driver can experience multiple vehicle handling characteristics without experiencing unstable vehicle conditions during switching.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integrated chassis control system for a vehicle having at least one vehicle subsystem, comprising:
   at least one sensor for sensing at least one vehicle parameter;
   at least one vehicle control system for adjusting the at least one vehicle subsystem;
   a driving mode switch for selecting at least one driving mode; and
   a controller responsive to said at least one sensor and said driving mode switch, said controller for controlling said at least one vehicle control system in accordance with said at least one driving mode;
   wherein said driving mode switch has at least two positions for signaling said controller to adjust a plurality of said at least one vehicle control system, resulting in the adjustment of a plurality of said at least one vehicle subsystem between a first driving mode and a second driving mode, said at least two positions comprising a normal position and a sporty position; and
   wherein said controller comprises a stability flag register settable to OFF and ON for indicating a stable condition for switching between said first driving mode and said second driving mode.

2. The integrated chassis control system of claim 1, wherein said at least one sensor comprises:
   a yaw sensor for sensing the vehicle yaw rate;
   at least one velocity sensor for sensing the velocity of the vehicle;
   a lateral acceleration sensor for sensing the vehicle lateral acceleration;
   a longitudinal acceleration sensor for sensing the vehicle longitudinal acceleration; and
   a steering angle sensor for sensing the vehicle steering angle; wherein
   signals from said sensors are received at said controller.

3. The integrated chassis control system of claim 2, wherein:
   said driving mode switch generates a user request signal when actuated, said user request signal being received at said controller.

4. The integrated chassis control system of claim 1, wherein said at least one vehicle control system comprises at least two of:
   a steering mechanism control system for adjusting a steering mechanism in response to said at least two positions of said driving mode switch;
   a braking mechanism control system for adjusting a braking mechanism in response to said at least two positions of said driving mode switch; and
   a suspension mechanism control system for adjusting a suspension mechanism in response to said at least two positions of said driving mode switch.

5. The integrated chassis control system of claim 1 wherein:
   said normal position is the default position in response to said controller being intialized.

6. The integrated chassis control system of claim 1, wherein said controller further comprises:
   a memory having executable instructions for instructing said controller receive signals from said at least one sensor and from said driving mode switch at a specified a sampling rate, and for instructing said controller to control said at least one vehicle control system in response thereto.

7. An integrated chassis control system for a vehicle having at least one vehicle subsystem, comprising:
   at least one sensor for sensing at least one vehicle parameter;
   at least one vehicle control system for adjusting the at least one vehicle subsystem;
   a driving mode switch; and
   a controller;
   said driving mode switch for selecting at least one driving mode and having at least two positions for signaling said controller to adjust said at least one vehicle subsystem between a first driving mode and a second driving mode;
   said controller comprising:
   a stability flag register settable to OFF and ON for indicating a stable condition for switching between said first driving mode and said second driving mode, said controller responsive to said at least one sensor and said driving mode switch, said controller for controlling said at least one vehicle control system in accordance with said at least one driving mode;

a first register for storing a first value; and a second register for storing a second value;

wherein said stability flag register is set to OFF in response to said first value being less than said second value for a first length of time.

8. The integrated chassis control system of claim 7, wherein:

said stability flag register is set to ON in response to said first value greater than said second value for a second length of time.

9. A method for actively controlling an intergrated chassis system for a vehicle, comprising:

sensing at least one vehicle parameter;

receiving at least one vehicle parameter signal representative of the at least one vehicle parameter;

receiving a driving mode signal representative of a driving mode request, the driving mode request being at least one of a normal mode request and a sporty mode request;

determining a stability flag setting in response to the at least one vehicle parameter signal and at least one programmed parameter;

analyzing the driving mode signal in view of the at least one vehicle parameter signal and the stability flag setting;

determining at least one control command;

communicating the at least one control command to at least two vehicle control systems; and actuating the at least two vehicle control systems for adjusting at least two vehicle subsystems in response to the at least one vehicle parameter signal, the driving mode signal being representative of a normal mode request or a sporty mode request, and the stability flag setting.

10. The method of controlling set forth in claim 9, wherein said sensing at least one vehicle parameter further comprises:

sensing the vehicle yaw rate;

sensing the vehicle velocity;

sensing the vehicle lateral acceleration;

sensing the vehicle longitudinal acceleration; and sensing the vehicle steering angle.

11. The method of controlling set forth in claim 9, wherein said determining at least one control command further comprises:

determining a steering mechanism control command;

determining a braking mechanism control command; and determining a suspension mechanism control command.

12. The method of controlling set forth in claim 9, wherein said determining a stability flag setting further comprises:

setting the stability flag to OFF in response to stable vehicle conditions existing and to ON in response to unstable vehicle conditions existing.

13. The method of controlling set forth in claim 9, further comprising:

commencing a third timer in response to said receiving a driving mode signal; and initializing the third timer in response to a power up condition.

14. The method of controlling set forth in claim 9, further comprising:

initializing the driving mode request to a default value and the stability flag to OFF in response to a power up condition.

15. A method for actively controlling an integrated chassis system for a vehicle, comprising:

sensing at least one vehicle parameter;

receiving at least one vehicle parameter signal representative of the at least one vehicle parameter;

receiving a driving mode signal representative of a driving mode request;

determining a stability flag setting in response to the at least one vehicle parameter signal and at least one programmed parameter;

setting the stability flag to OFF in response to stable vehicle conditions existing and to ON in response to unstable vehicle conditions existing;

setting the stability flag in response to calculating a first value, calculating a second value, comparing the first value to the second value, and setting the stability flag to OFF in response to the first value being less than the second value for a first length of time;

analyzing the driving mode signal in view of the at least one vehicle parameter signal and the stability flag setting;

determining at least one control command;

communicating the at least one control command to at least one vehicle control system; and actuating the at least one vehicle control system for adjusting at least one vehicle subsystem in response to the at least one vehicle parameter signal, the driving mode signal, and the stability flag setting.

16. The method of controlling set forth in claim 15, wherein said setting the stability flag further comprises:

setting the stability flag to ON in response to the first value being great than the second value for a second length of time.

17. The method of controlling set forth in claim 16, further comprising:

commencing a first timer in response to the first value being greater than the second value; and initializing the first timer in response to a power up condition.

18. The method of controlling set forth in claim 15, further comprising:

commencing a second timer in response to the first value being less than the second value; and initializing the second timer in response to a power up condition.

19. An integrated chassis control system for a vehicle having a vehicle subsystem, comprising:

a sensor for sensing a vehicle parameter;

a vehicle control system for adjusting the vehicle subsystem;

a driving mode switch for selecting a driving mode; and a controller responsive to said sensor and said driving mode switch, said controller for controlling said vehicle control system in accordance with said driving mode;

wherein said driving mode switch has at least two positions for signaling said controller to adjust a plurality of said vehicle control systems, resulting in the adjustment of a plurality of said vehicle subsystems between a first driving mode and a second driving mode, said at least two positions comprising a normal position and a sporty position;

wherein said controller comprises a stability flag register settable to OFF and ON for indicating a stable condition for switching between said first driving mode and said second driving mode; and wherein the adjustment of said plurality of vehicle subsystems results in a change in handling characteristics of the vehicle.

* * * * *